UNITED STATES PATENT OFFICE.

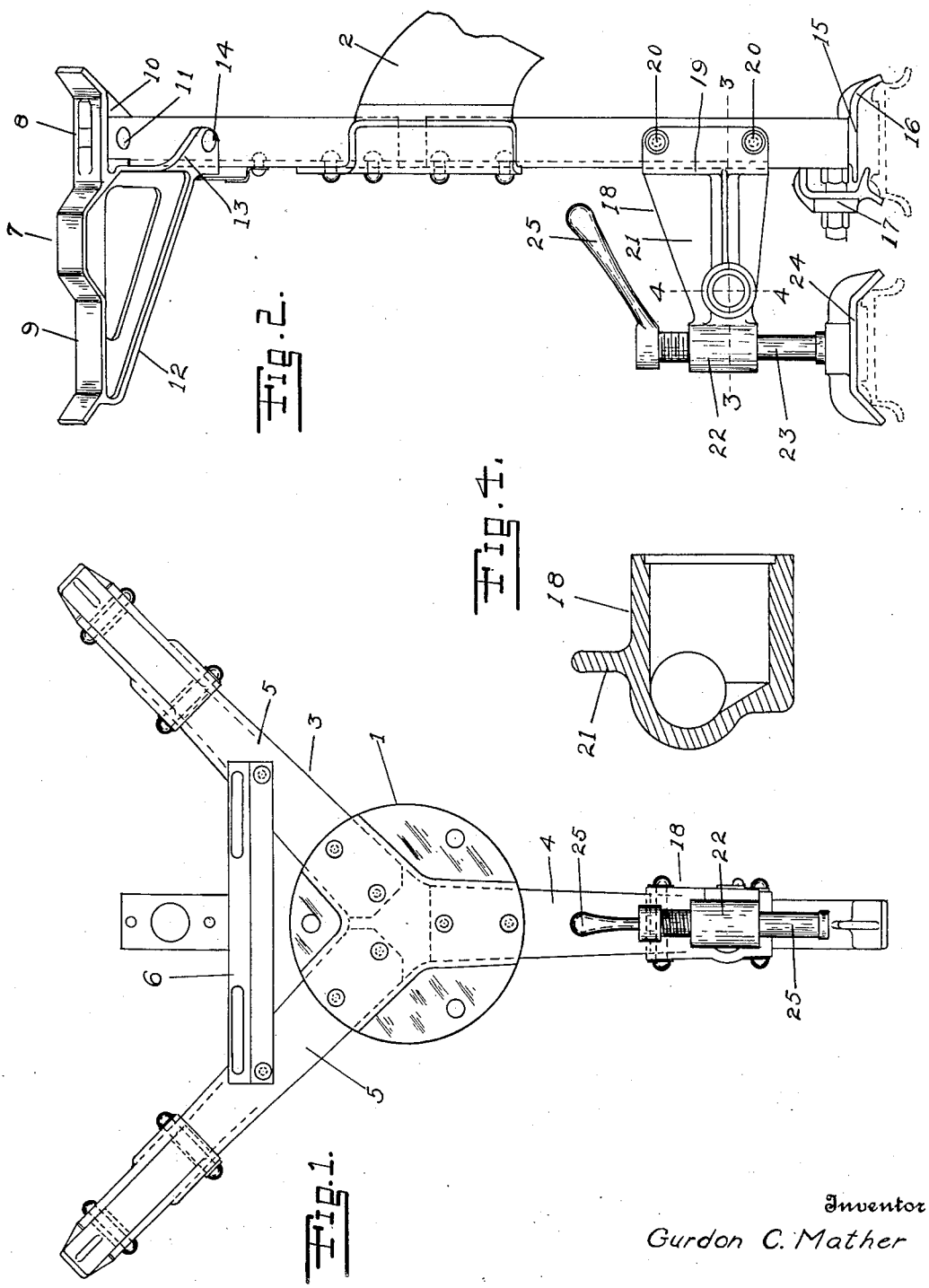

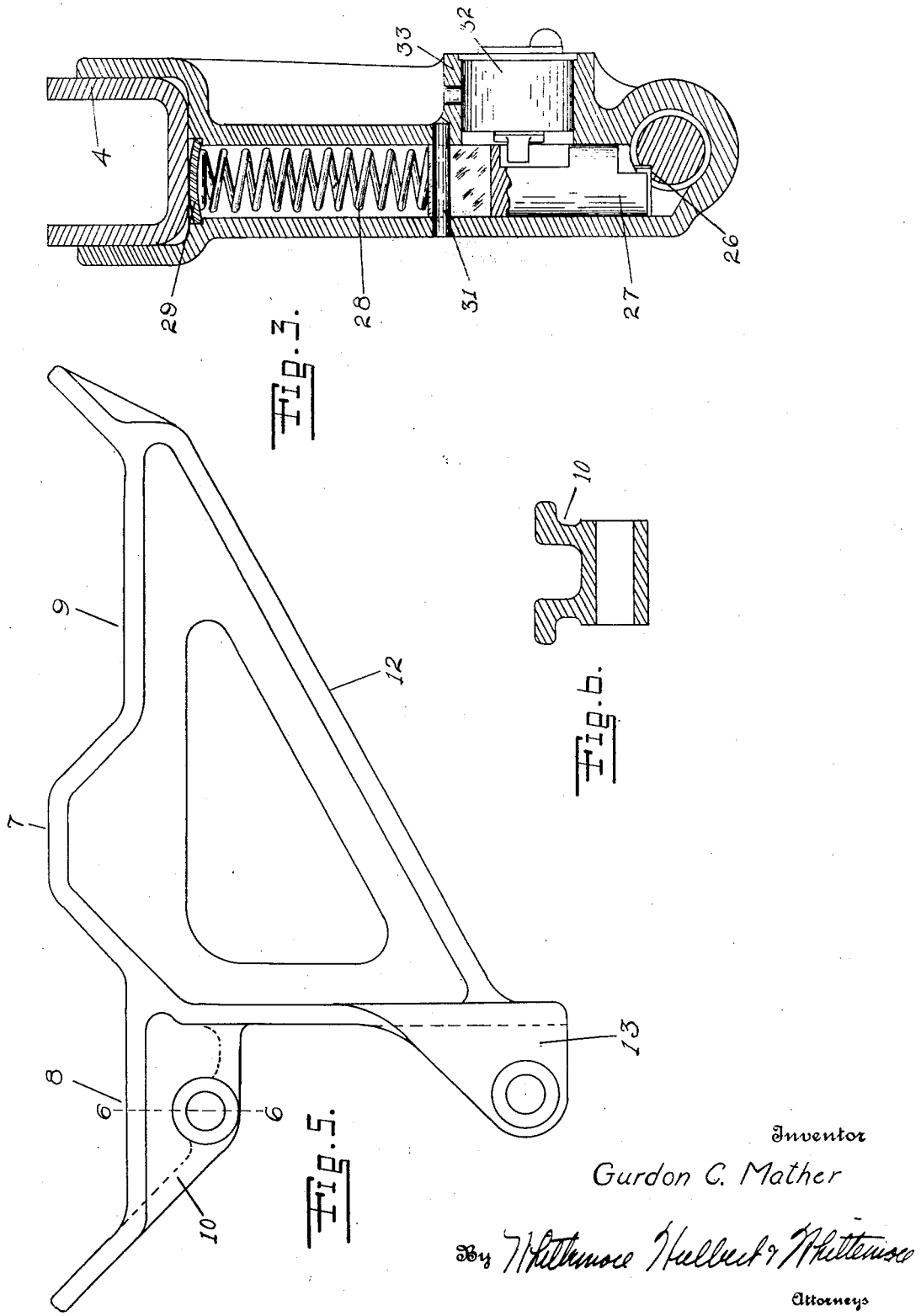

GURDON C. MATHER, OF DETROIT, MICHIGAN.

DOUBLE-TIRE CARRIER AND LOCK.

1,381,321.　　　　　Specification of Letters Patent.　　Patented June 14, 1921.

Application filed April 24, 1920. Serial No. 376,219.

*To all whom it may concern:*

Be it known that I, GURDON C. MATHER, a citizen of the United States of America, residing at Detroit, in the county of Wayne and State of Michigan, have invented certain new and useful Improvements in Double-Tire Carriers and Locks, of which the following is a specification, reference being had therein to the accompanying drawings.

The invention relates to tire-carriers and has for its object the provision of a simple construction for carrying a pair of spare tires. Another object is the provision of a novel locking arrangement for the tires. Further objects of the invention reside in the various details and combinations of parts as more fully hereinafter set forth.

In the drawings:

Figure 1 is a front elevation of a construction embodying my invention.

Fig. 2 is a side elevation thereof;

Figs. 3 and 4 are cross sections on the lines 3—3 and 4—4 respectively of Fig. 2;

Fig. 5 is a side elevation of a supporting bracket;

Fig. 6 is a cross section on the line 6—6 of Fig. 5.

1 is a centrally located base of the tire carrier which is suitably secured to the support 2 upon a motor vehicle. 3 are arms rigidly secured to the base 1 and preferably extending radially therefrom, and having their longitudinal axes in a common plane, these arms being of channel cross section. There are preferably three of these arms, comprising the lower arm 4 which extends vertically downward from the base 1 and the upper arms 5 which extend upwardly and outwardly from the base 1. A suitable combined license and lamp support 6 is secured to the upper arms.

A bracket 7 for supporting the tires is secured at the outer end of each of the upper arms 5. This bracket has the concave inner and outer seats or bearings 8 and 9 respectively, for engagement with the tire demountable rims, the seat 8 being in alinement with the upper arm. Each bracket has the depending flange 10 which extends between the sides of the upper arm and is permanently secured thereto, as by means of the rivet 11, the web of the arm being cut away at its upper end for the passage of this flange. 12 is a reinforcing arm for the outer seat 9 the lower part of this arm merging into the channel shaped portion 13 of the bracket which embraces the upper arm and is permanently secured thereto, as by means of the rivet 14.

The lower arm 4 has the seat or bearing 15 rigidly secured thereto, and in alinement therewith which seat has the inclined flange 16 at the inner side. 17 is a removable clamping lug secured to the outer side of the lower arm and adapted to engage and force the inner tire rim against the inclined flange 16 of the tire support.

For clamping the outer tire rim in place the following construction is provided: 18 is a bracket having the U-shaped portion 19 embracing the lower arm 4 and permanently secured thereto, as by means of the rivets 20. 21 are reinforcing flanges for the bracket and 22 is an enlargement at the outer end of the bracket having an internally threaded aperture therethrough. 23 is a threaded stem engaging in the aperture and 24 is a seat or bearing upon the lower end of the stem and movable thereby to clamp the outer rim in place. 25 is a hand lever for rotating the stem 23 in either direction.

In order to lock the clamp 24, when in firm engagement with the outer rim, the stem 23 has the notch 26 in its periphery which is engageable by the outer end of a locking plunger 27 to prevent rotation of the stem. This plunger is slidable within the bracket 18 and its inner end is in engagement with the coil spring 28, the inner end of the latter engaging an abutment 29 resting against the web of the lower arm 4. For preventing rotation of the plunger 27, the latter has the longitudinally extending groove at its inner end, the walls of which slidably engage the pin 31 extending through the bracket 18. 32 is a suitable lock located in the enlargement 33 upon the bracket. The groove is so disposed and designed in relation to that part of the plunger which engages it, that it permits the stem to be turned to set the clamp tight, but prevents retraction of the stem until the plunger is withdrawn from the groove by the bolt of the lock.

Although I have referred to the arms 3 as being of channel cross section, it is to be understood that the arms can be of other cross section, such as tubular, solid, etc.

What I claim as my invention is:

1. The combination with a base provided with double seated arms for engagement with a pair of mounted tire rims adapted to coöperate with an arm extending from the opposite side of said base and having a seat for engagement with one rim applied to the other arms, of a bracket extending from the latter arm, a longitudinally grooved stem screw threaded in the outer end portion of said bracket and provided with a clamp for engagement of another rim applied to the other arms, a spring-projected plunger longitudinally movable in the bracket and normally engaging the slot in the stem and preventing retraction of the stem when in locked position, and a lock in the bracket adapted to withhold the plunger from engagement with the stem.

2. The combination with a base provided with a pair of double-seated arms for engagement with a pair of demountable tire rims and an oppositely extended arm provided with a seat for engaging a single tire rim placed upon the corresponding seats of the other arms, of a bracket secured to the single seated arm, a stem in screw threaded engagement with said bracket provided with a seat fitting in the plane of the other arms for coöperation with the latter, the stem being longitudinally slotted, a plunger reciprocable in the bracket transversely to the stem for engaging the slot thereof, a spring adapted to project the plunger into the slot and a lock adapted to hold the plunger in retracted position.

3. The combination with a base, of arms extending from one side of said base, seats upon said arms adapted for engagment with a pair of demountable tire rims, an arm extending from the opposite side of said base, a seat upon said arm adapted for engagement with one of said rims, a hollow laterally extending bracket secured to said last mentioned arm, a longitudinally notched stem threadedly engaging in the outer end of said bracket, a clamp upon said stem adapted for engagment with the other of said rims, a locking plunger longitudinally slidably mounted within said hollow bracket and adapted for engagement with the notch in said stem, means for yieldably forcing said plunger into engagement with said stem and a lock mounted on said hollow bracket adapted to hold the plunger disengaged from the stem.

4. The combination with a base, of arms extending from one side of said base, seats upon said arms adapted for engagement with a pair of demountable tire rims, an arm extending from the opposite side of said base, a seat upon said arm adapted for engagement with one of said rims, a hollow laterally extending bracket secured to said last mentioned arm, a longitudinally notched stem threadedly engaging in the outer end of said bracket, a clamp upon said stem adapted for engagement with the other of said rims, a locking plunger longitudinally slidably mounted within said hollow bracket and adapted for engagement with the notch in said stem, means for yieldably forcing said plunger into engagement with said stem, means for preventing rotation of said locking plunger, and a lock mounted upon said hollow bracket adapted to hold the plunger in released position.

In testimony whereof I affix my signature.

GURDON C. MATHER.